United States Patent [19]

Box

[11] Patent Number: 5,497,707

[45] Date of Patent: Mar. 12, 1996

[54] ROBOTIC VEHICLE

[75] Inventor: W. Donald Box, Oak Ridge, Tenn.

[73] Assignee: Martin Marietta Energy Systems, Inc., Oak Ridge, Tenn.

[21] Appl. No.: 212,355

[22] Filed: Jun. 30, 1994

Related U.S. Application Data

[63] Continuation-in-part of Ser. No. 949,898, Sep. 23, 1992, Pat. No. 5,293,823.

[51] Int. Cl.$^6$ .................................................. B61B 13/00
[52] U.S. Cl. ........................................................ 104/138.2
[58] Field of Search ...................... 104/138.2; 346/33 P; 378/60; 73/866.5, 865.8; 33/544, 777

[56] References Cited

U.S. PATENT DOCUMENTS

| | | | |
|---|---|---|---|
| 3,036,530 | 5/1962 | Mills et al. | 104/155 |
| 4,522,129 | 6/1985 | Jerberyd | 104/138 G |
| 4,770,105 | 9/1988 | Takagi et al. | 104/138.2 |
| 4,848,168 | 7/1989 | Negishi | 73/865.8 |
| 4,862,808 | 9/1989 | Hedgcoxe et al. | 104/138.2 |
| 4,938,081 | 7/1990 | Negishi | 73/865.8 |
| 4,953,412 | 9/1990 | Rosenberg et al. | 73/865.8 |
| 5,018,451 | 5/1991 | Hapstack | 104/138.2 |
| 5,080,020 | 1/1992 | Negishi | 104/138.2 |
| 5,121,694 | 6/1992 | Zollinger | 104/138.2 |
| 5,293,823 | 3/1994 | Box | 104/138.2 |

FOREIGN PATENT DOCUMENTS

| | | | |
|---|---|---|---|
| 2557055 | 12/1983 | France | 104/138.2 |
| 1186462 | 1/1988 | Japan . | |
| 0060875 | 3/1990 | Japan | 104/138.2 |
| 0045464 | 2/1991 | Japan | 104/138.2 |
| 0032976 | 2/1991 | Japan | 104/138.2 |
| 0025067 | 2/1991 | Japan | 104/138.2 |
| 3086679 | 4/1991 | Japan . | |
| 3167066 | 7/1991 | Japan | 104/138.2 |
| 3208765 | 9/1991 | Japan | 104/138.2 |
| 4002565 | 1/1992 | Japan | 104/138.2 |

OTHER PUBLICATIONS

Popular Mechanics, Jun. 1992, p. 24, Tech Update—"Robots of the Wasteland" and Mechanical Caterpillar.

*Primary Examiner*—Mark T. Le
*Attorney, Agent, or Firm*—Jeffrey N. Cutler; Martin J. Skinner; Shelley J. Stafford

[57] ABSTRACT

A robotic vehicle (10) for travel through an enclosed or partially enclosed conduit or pipe including vertical and/or horizontal conduit or pipe. The robotic vehicle (10) comprises forward and rear housings (32 and 12) each provided with a surface engaging mechanism for selectively engaging the walls of the conduit through which the vehicle is travelling, whereby the housings (32 and 12) are selectively held in a stationary position within the conduit. The vehicle (10) also includes at least three selectively extendable members (46), each of which defines a cavity (56) therein. The forward end portion (50) of each extendable member (46) is secured to the forward housing (32) and the rear end portion (48) of each housing is secured to the rear housing (12). Each of the extendable members (46) is independently extendable from a retracted position to an extended position upon the injection of a gas under pressure into the cavity (56) of the extendable member such that the distance between the forward housing (32) and the rear housing (12) can be selectively increased. Further, each of the extendable members (46) is independently retractable from the extended position to the retracted position upon the application of a vacuum to the cavity (56) of the extendable member (46) such that the distance between the forward housing (32) and the rear housing (12) can be selectively decreased.

15 Claims, 11 Drawing Sheets

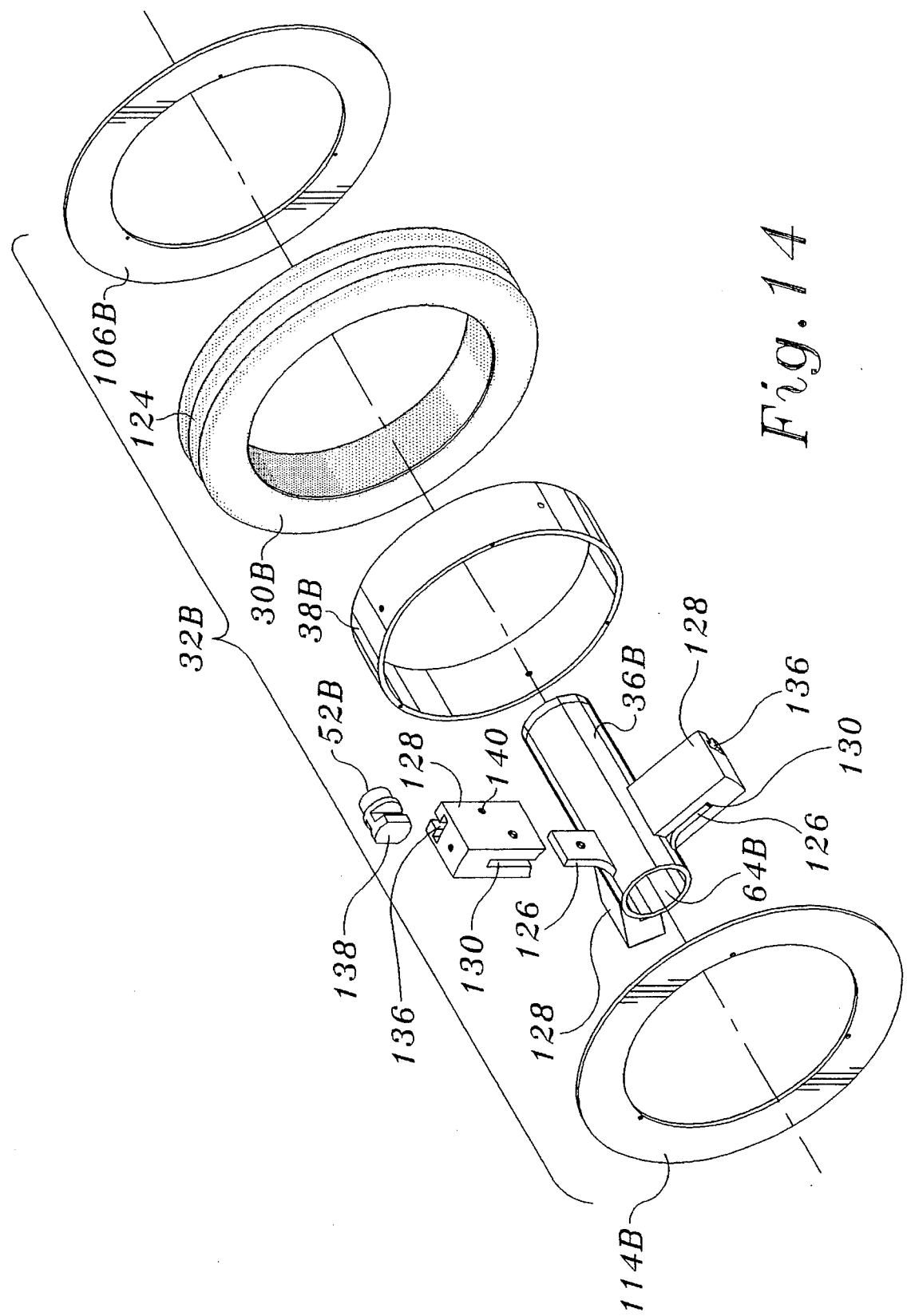

ROBOTIC VEHICLE

This invention was made with Government support under contract DE-AC05-84OR21400 awarded by the U.S. Department of Energy to Martin Marietta Energy Systems, Inc. and the Government has certain rights in this invention.

This invention is a continuation-in-part patent application based upon parent application Ser. No. 07/949,898 filed on Sep. 23, 1992, now U.S. Pat. No. 5,293,823.

TECHNICAL FILED

This invention relates to a robotic vehicle for carrying monitoring devices, tools and other items, and which is suitable for remotely controlled travel through tunnels, ducts, pipes and the like. In this particular invention the robotic vehicle includes forward and rear housings, each provided with surface engaging means, and a plurality of extendable members positioned therebetween.

BACKGROUND ART

The use of robotic vehicles has become prevalent in many industries in recent years. Such vehicles are commonly used for carrying monitoring devices, tools or other items, and can travel into hazardous or confined areas where human workers cannot or should not go. However, devising robotic vehicles capable of travelling through, and efficient operation in, enclosed and/or confined spaces such as within a system of pipes, ducts or other conduits, has presented difficulties.

Various robotic devices have heretofore been designed in an effort to solve problems relating to efficient travel and operation within a confined space or travelway. For example, various robotic devices are disclosed in U.S. Pat. Nos. 3,036,530; 4,522,179; 4,770,105; 4,848,168; 4,862,808; 4,938,081; 4,953,412; 5,018,451; 5,080,020 and 5,121,694. Other robotic devices are disclosed in Japanese Patent Application Nos. 3[1991]-25067; 3[1991]-32976; 3[1991]-45464; 2[1990]-60875; 3[1991]-86679; 3[1991]-167066; 1[1989]-186462; 3[1991]-208765; and 04[1992]-2565; and French Patent No. 2,557,055. A robotic device is also disclosed in an article entitled *Mechanical Caterpillar*, POPULAR MECHANICS, June 1992, Vol. 169, No. 6. However, such devices tend to either lack the mobility or maneuverability for efficient operation or they include highly complex mechanisms for achieve mobility and maneuverability which make the devices expensive and difficult to operate and maintain. In this regard, for travel within a system of pipes or ducts efficient operation requires that the robotic vehicle be capable of controlled, small radius turns such that the vehicle can move between pipes or ducts which may intersect at various angles. Moreover, a mechanical breakdown of the robotic vehicle within a pipe or conduit system can result in great cost and inconvenience. Thus, mechanical complexity, with the attendant risk of a malfunction, is an unacceptable tradeoff for achieving mobility and maneuverability.

Therefore, it is an object of the present invention to provide a robotic vehicle capable of travel through an enclosed or partially enclosed conduit, including vertical and/or horizontal conduit or pipe.

It is another object of the present invention to provide a robotic vehicle capable of transporting various monitoring devices, such as, for example, video cameras, pH and pOH electrodes, oxygen content monitors, conductivity probes, radioactivity monitors, fiber optics, etc., into an enclosed or partially enclosed conduit or pipe.

Yet another object of the present invention is to provide a robotic vehicle which is capable of transporting various tools through a conduit or pipe, such as, for example, scrubbing or liquid spraying tools for cleaning the conduit, grasping devices or scoops for retrieving objects or taking samples from within the conduit, and various other remotely controlled devices.

Still another object of the present invention is to provide a robotic vehicle which is sufficiently maneuverable to travel between intersecting conduits of various sizes and otherwise suitable for travel through complex conduit systems.

A further object of the present invention is to provide a robotic vehicle which offers reliable operation, and which is inexpensive to manufacture and maintain.

DISCLOSURE THE INVENTION

Other objects and advantages will be accomplished by the present invention which provides a robotic vehicle for travel through an enclosed or partially enclosed conduit or pipe. The robotic vehicle comprises forward and rear housings, each provided with surface engaging means for selectively engaging the walls of the conduit through which the vehicle is travelling so as to selectively hold the housing in a stationary position within the conduit. The vehicle also includes at least three selectively extendable members, each of which defines a cavity therein. The forward end portion of each extendable member is secured to the forward housing and the rear end portion of each extendable member is secured to the rear housing.

Each of the extendable members is independently extendable from a retracted position to an extended position upon the injection of a gas under pressure into the cavity of the extendable member such that the distance between the forward housing and the rear housing can be selectively increased. Further, each of the extendable members is independently retractable from the extended position to the retracted position upon the application of a vacuum to the cavity of the extendable member such that the distance between the forward housing and the rear housing can be selectively decreased. Accordingly, travel of the robotic vehicle can be accomplished by alternately securing the position of either the forward or rear housing within the conduit using the surface engaging means, while disengaging the other housing so as to allow it to move within the conduit, and selectively extending or retracting the extendable members so as to effect movement of the housing which is disengaged from the surface of the conduit.

BRIEF DESCRIPTION OF THE DRAWINGS

The above mentioned features of the invention will be more clearly understood from the following detailed description of the invention read together with the drawings in which:

FIG. 14 illustrates a exploded prospective view of the forward housing of an alternate embodiment of the robotic vehicle of the present invention.

BEST MODE FOR CARRYING OUT THE INVENTION

Figure 1:
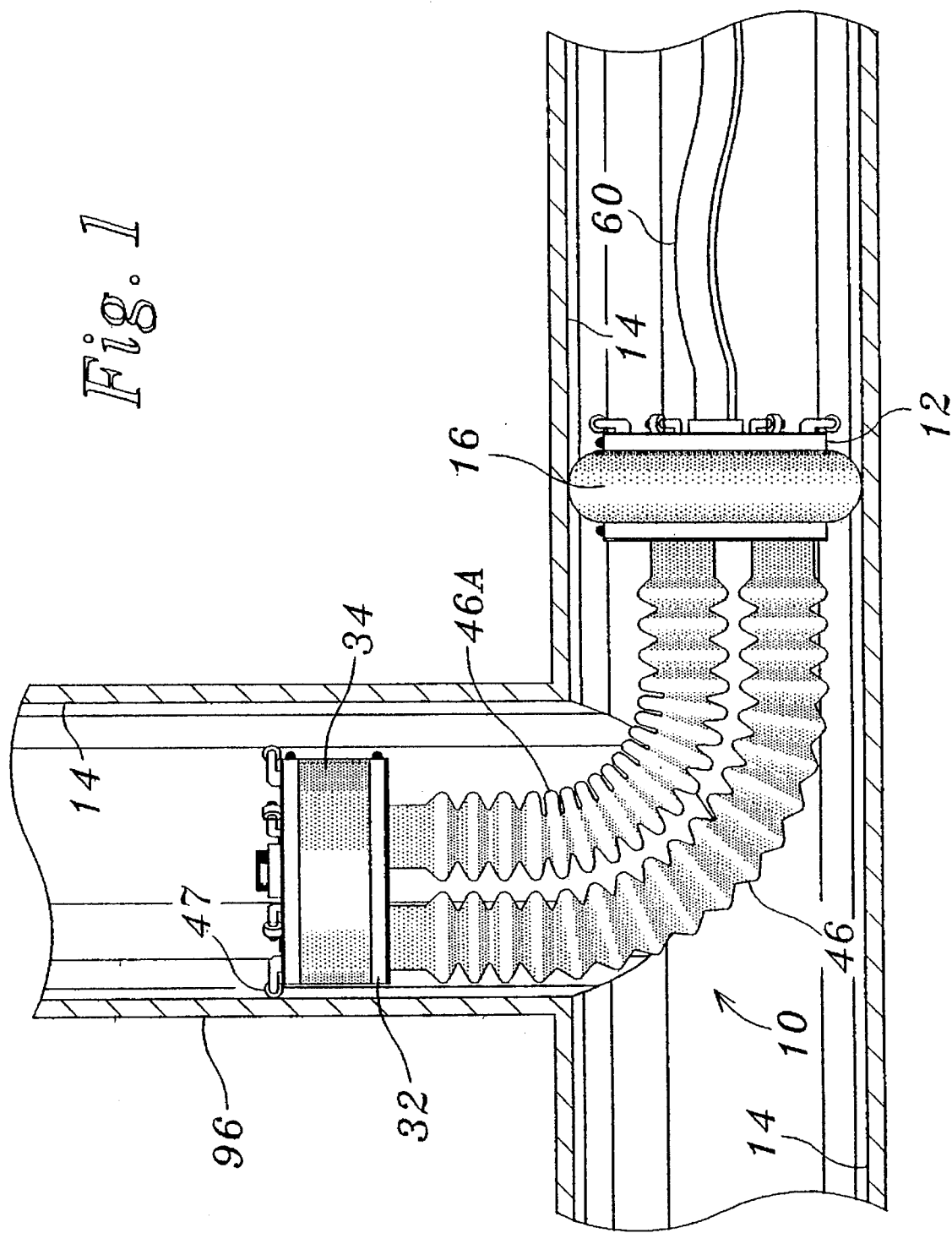
FIG. 1 illustrates a side elevation view of a robotic vehicle of the present invention as it is positioned in a conduit.
Figure 2:
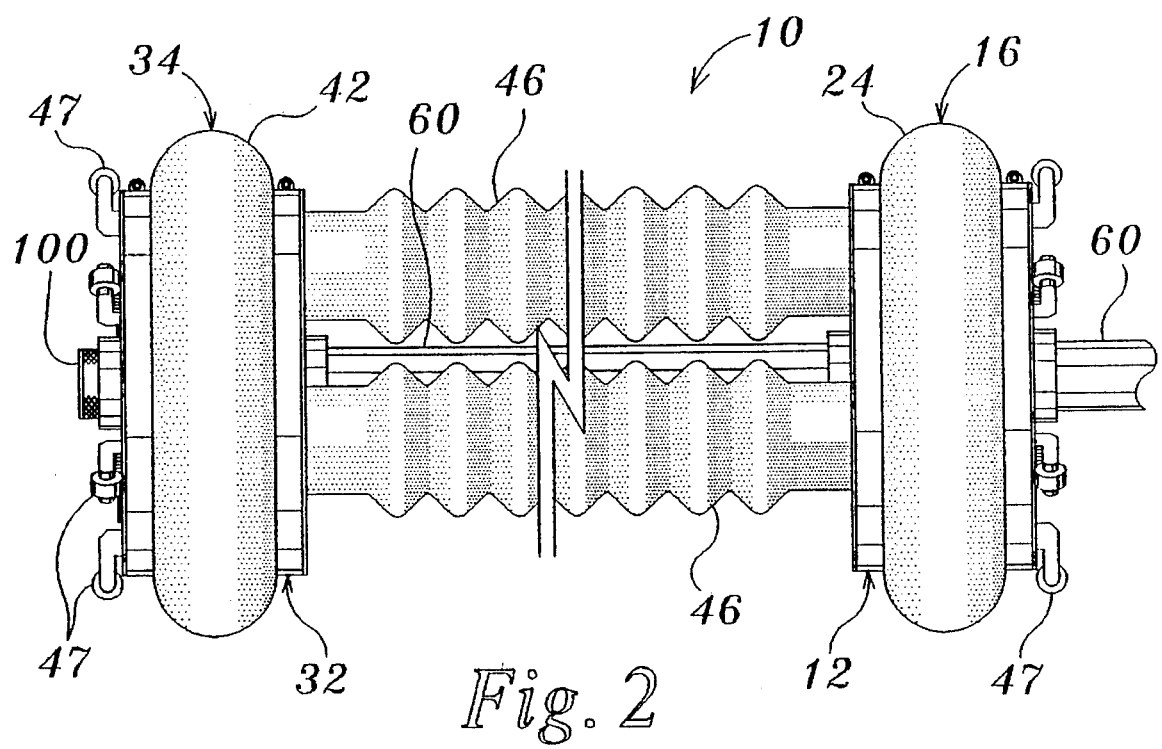
FIG. 2 illustrates a side elevation view of a robotic vehicle of the present invention.
Figure 3:
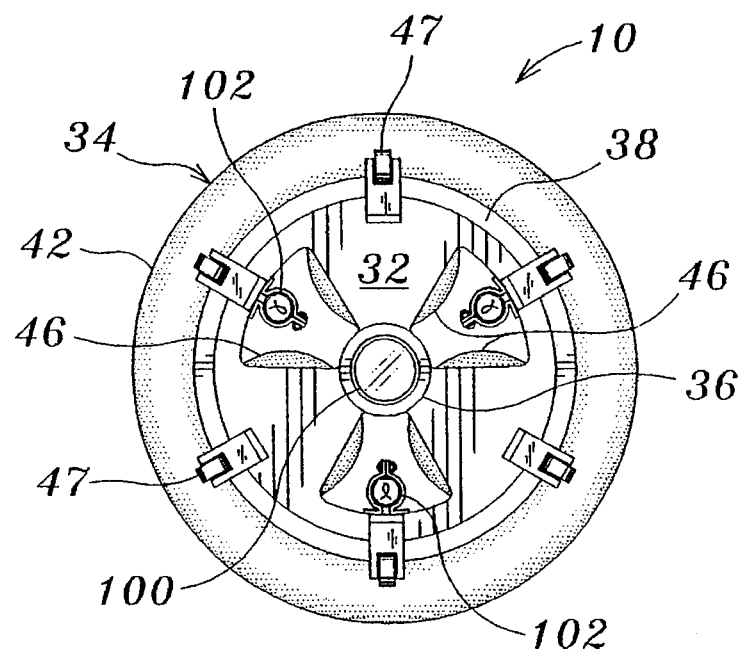
FIG. 3 illustrates a front elevation view of a robotic vehicle of the present invention.
Figure 4:
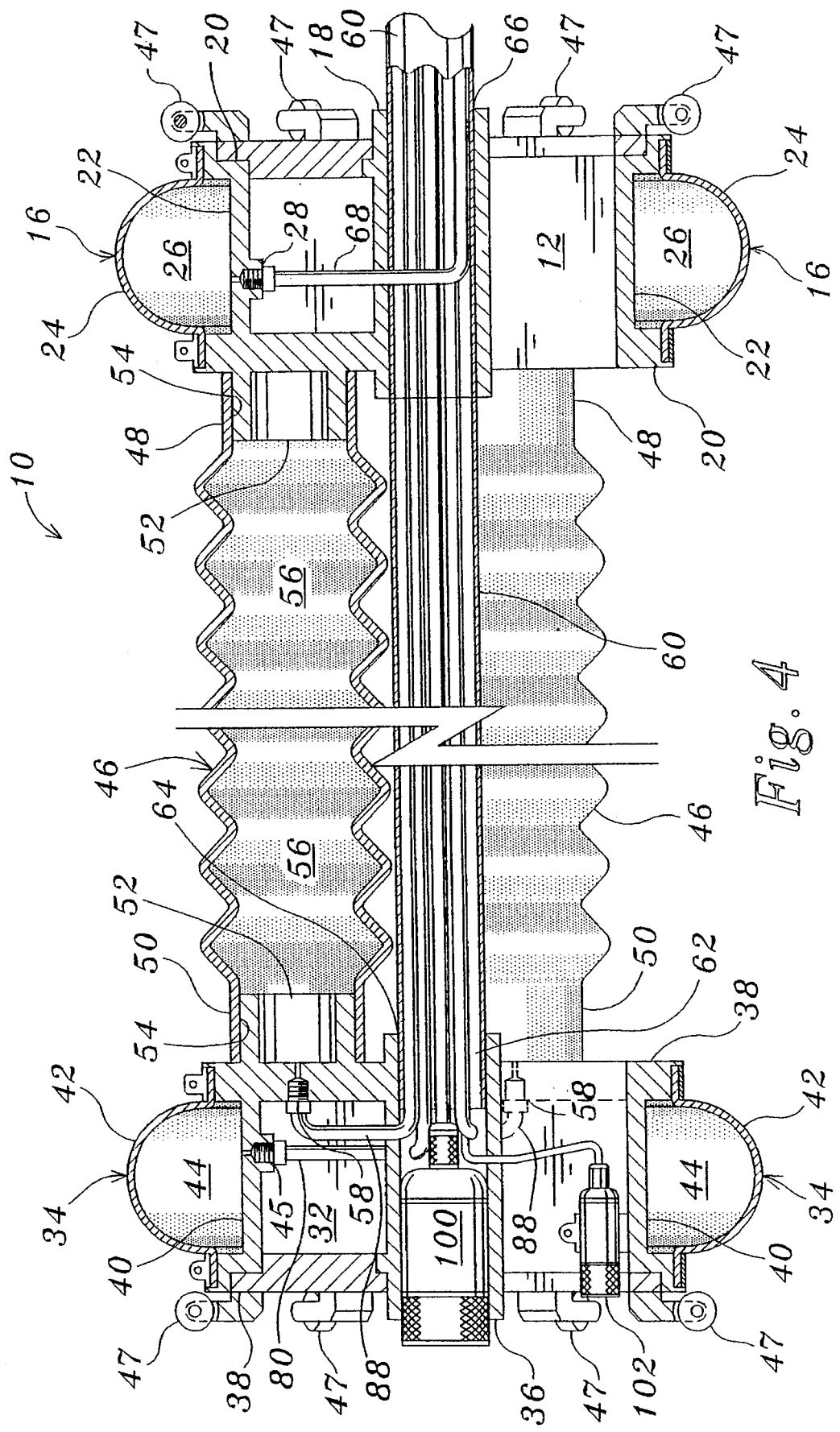
FIG. 4 illustrates a side elevation view, in section, of a robotic vehicle of the present invention.
Figure 5:
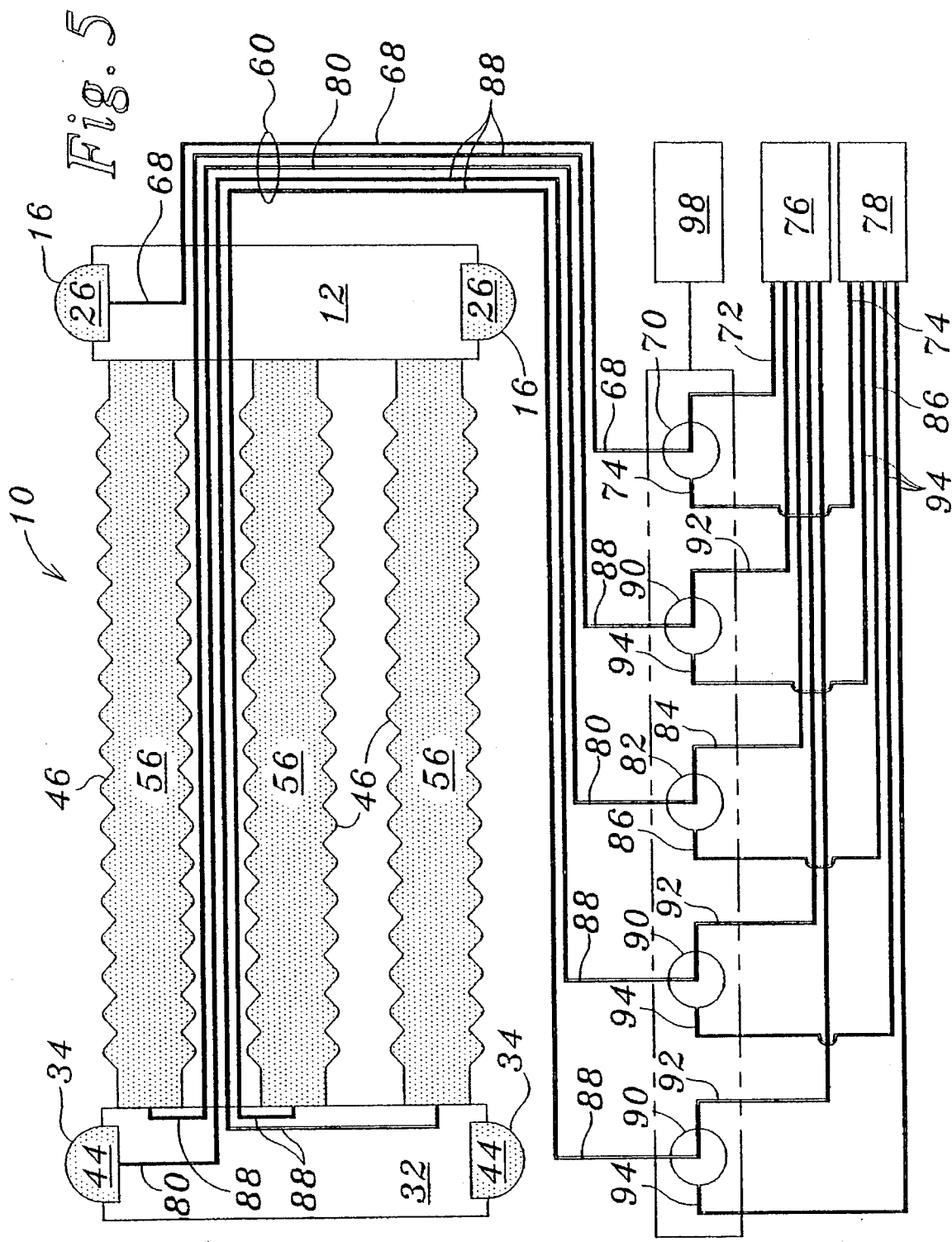
FIG. 5 illustrates a schematic diagram of the pneumatic system of a robotic vehicle of the present invention.
Figure 6:
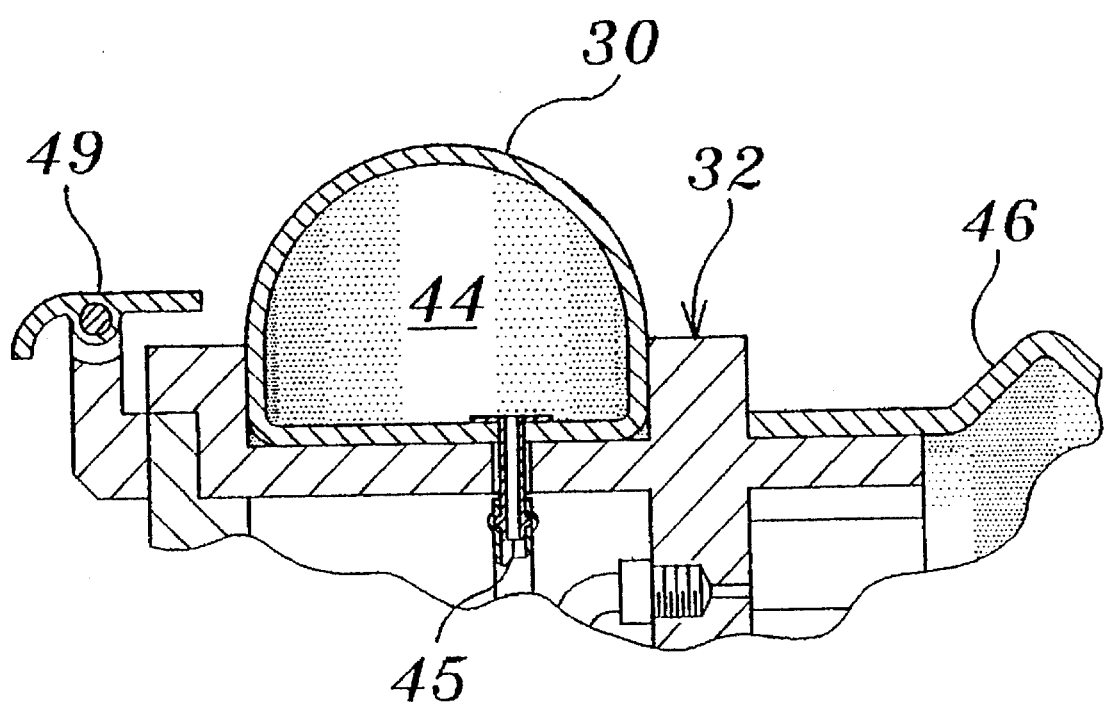
FIG. 6 illustrates a partial side elevation view, in section, of an alternate embodiment of the robotic vehicle of the present invention.

A robotic vehicle incorporating various features of the present invention is illustrated generally at 10 in the FIGS. 1 through 5. The robotic vehicle 10 comprises a rear housing 12 provided with surface engaging means for selectively engaging the interior walls 14 of a pipe or conduit so as to selectively maintain the housing 12 in a stationary position within such pipe or conduit. In the illustrated embodiment of FIGS. 1 through 5 the surface engaging means includes an inflatable bladder 16 which circumscribes the housing 12 and which can be selectively inflated to engage the walls 14 of the conduit and selectively deflated to allow movement of the housing 12 through the conduit.

More specifically, in the preferred illustrated embodiment of FIGS. 1–4, the rear housing 12 defines a centrally disposed hub portion 18 and an annular outer rim 20, the outer rim 20 being provided with a circumscribing recess 22. A substantially fluid impervious rubber or elastomeric covering sheet 24 is secured over the recess 22 such that a cavity 26 is cooperatively formed by the housing 12 and the covering sheet 24. Further, at least one fluid access port 28, accessing the cavity 26, is provided in the rim 20 to facilitate the selective inflation and evacuation of the bladder 16.

It will be appreciated that the illustrated bladder 16 is only one possible bladder means which can be utilized. For example, a tubular bladder such as the bladder 30 illustrated in FIG. 6 can be used if desired. Further, whereas FIGS. 1 through 6 illustrate bladders 16 and 30 which circumscribe the housing 12 (and the housing 32 described hereinafter), it will be understood that a plurality of selectively spaced inflatable bladders, or, as will be discussed below a plurality of pneumatic actuators or pistons, can be used if desired.

The robotic vehicle 10 also includes a forward housing 32 provided with surface engaging means for selectively engaging the walls 14 of the pipe or conduit so as to selectively maintain the housing 32 in a stationary position within such pipe or conduit. As in the case of the illustrated housing 12, the surface engaging means of the forward housing 32 includes an inflatable bladder 34 which circumscribes the housing 32 and which can be selectively inflated to engage the walls 14 of the conduit. Also, the forward housing 32 defines a centrally disposed hub portion 36 and an annular outer rim 38, the outer rim 38 being provided with a circumscribing recess 40. A substantially fluid impervious rubber or elastomeric covering sheet 42 is secured over the recess 40 such that a cavity 44 is cooperatively formed by the housing 32 and the covering sheet 42. Furthers at least one fluid access port 45, accessing the cavity 44, is provided in the rim 38 to facilitate the selective inflation and evacuation of the bladder 34.

It will also be noted that the housings 12 and 32 can be provided with wheel members 47 which extend radially beyond the outer rims 20 and 38 to facilitate movement of the housings 12 and 32 through a conduit when the associated bladder 16 or 34 is not inflated and engaging the walls of the conduit. Alternatively, the housings 12 and 32 can be provided with skid members which facilitate the movement of the housings past irregularities in the walls 14 of a conduit such as the pivotally mounted skid members 49 illustrated in FIG. 6.

The robotic device 10 further comprises at least three extendable members which are secured between the rear housing 12 and the forward housing 32, and which serve to selectively move the housings 12 and 34 toward or away from one another to effect movement of the robotic vehicle 10. In the preferred illustrated embodiment of FIGS. 1 through 5, the extendable members define tubular bellows members 46, each of the bellows members 46 having a first end portion 48 secured to the housing 12 and a second, opposite end portion 50 secured to the housing 32.

More specifically, in the preferred illustrated embodiment the housings 12 and 32 are provided with mounting collars 52 which are received in openings 54 defined in the end portions 48 and 50 of the bellows members 46, with suitable clamp means being used to secure the end portions 48 and 50 on their respective collars 52. Thusly secured, a cavity 56 is defined within each of the bellows members 46, with fluid access to each of the cavity being provided through at least one access port 58, which in the preferred embodiment of the robotic vehicle 10 is disposed in the housing 32.

The bellows members 46 are preferably fabricated of a rubber or elastomeric material such that they not only extend axially upon injection of fluid under pressure into the cavities 56 and retract axially upon application of a vacuum to the cavities 56, but also are laterally flexible to allow the bellows members to bend as the robotic vehicle 10 travels through bends and corners in a conduit. In this regard, one suitable fabricating material is corrugated rubber tubing, but it is contemplated that various flexible materials could be used.

The cavities 26 and 44 of the housings 12 and 32, respectively, and the cavities 56 of the bellows members 46 are connected to a suitable source of pressurized gas, and to a suitable vacuum source, by a flexible umbilical cable 60. In the preferred illustrated embodiment the cable 60 defines and outboard end portion 62 which is received in an opening 64 provided in the hub portion 36 of the housing 32 and extends rearwardly, through an opening 66 provided in the hub portion 18 of the housing 12, to be connected to the pressurized gas source and vacuum source.

The umbilical cable 60 carries a plurality of pneumatic lines for establishing fluid communications between the cavities 26, 44 and 56 and the pressurized gas source and vacuum source. As is best illustrated in the schematic illustration of FIG. 5. The cavity 26 of the bladder 16 is connected via pneumatic line 68 to a two-way valve 70, with the valve 70 being connected via pneumatic lines 72 and 74 to a source of pressurized gas 76 and a vacuum source 78, respectively. Similarly, the cavity 44 of the bladder 34 is connected via pneumatic line 80 to a two-way valve 82, with the valve 82 being connected via pneumatic lines 84 and 86 to the source of pressurized gas 76 and the vacuum source 78, respectively. Thus, by selective manipulation of the valves 70 and 82, the bladders 16 and 34 can be selectively injected with pressurized gas so as to expand such bladders, or evacuated to contract the bladders.

The cavities 56 of the bellows members 46 are each connected via a pneumatic line 88 to a two-way valve 90, with each of the valves 90 being connected via pneumatic lines 92 and 94 to the source of pressurized gas 76 and a vacuum source 78, respectively. Accordingly, by selectively manipulating the valves 90, the bellows members 46 can be selectively filled with pressurized gas to move such bellows members to an extended position, or evacuated so as to move the bellows members to a retracted position.

In order to effect forward travel of the robotic vehicle 10 through a conduit a gas is injected into the bladder 16 of the rear housing 12 such that the bladder 16 expands to engage the walls 14 of the conduit, and a vacuum is applied to the bladder 34 of the forward housing 32 such that the bladder 34 is deflated and the housing 32 is free to move within the conduit. With the rear housing held in place within the conduit by the inflated bladder 16, and with the bladder 34 deflated to allow movement of the forward housing 32, gas is injected into one or more of the cavities 56 of the belows members 46, thereby causing such bellows members 46 to expand axially and move the housing 32 away from the housing 12. After the bellows members 46 have been selectively extended, gas is injected into the bladder 34 of the forward housing 32 such that the bladder 34 expands to engage the walls 14 of the conduit, and a vacuum is applied to the bladder 16 of the rear housing 12 such that the bladder 16 is deflated and the housing 12 is free to move within the conduit. With the forward housing held in place within the conduit by the inflated bladder 34, and with the bladder 16 deflated to allow movement of the rear housing 12, a vacuum is applied to the cavities 56 of the bellows members 46, thereby causing the bellows members 46 to contract axially and move the housing 12 toward the housing 32.

Of course, it will be understood that forward travel is perpetuated by repetition of the above-outlined sequence. Further, it will be recognized that by reversing the sequence, i.e. such that the bellows members 46 are axially expanded as the bladder 34 of the housing 32 is expanded and the bladder 16 of the housing 12 is evacuate, etc., rearward travel of the robotic vehicle 10 can be effected.

As is best illustrated in FIG. 1, the providing of the vehicle 10 with at least three bellows members 46 allows the robotic vehicle 10 to execute turns which allow it to readily navigate extreme bends in a conduit or to be maneuvered into intersecting conduits. In this regard, by applying a vacuum to at least one of the bellows members 46, while at the same time injecting the remaining bellows member or members 46 with pressurized gas, or by selectively varying the extent to which the certain bellows members 46 are extended relative to the other bellows members 46, the angular direction of travel can be altered.

For example, in FIG. 1 a vacuum has been applied to the cavity 56 of the bellows member 46A as pressurized gas is injected into the cavities 56 of the other bellows members 46, thus raising the forward housing 32 into the intersecting conduit 96. After the housing 32 has been maneuvered into the intersecting conduit 96, pressurized gas is injected into the cavity 44 such that the housing 32 is held in position within the conduit 96. A vacuum is then applied to the cavity 26 of the housing 12 and the cavities 56 of the bellows members such that the housing 12 is drawn into the intersecting conduit 96.

Thus, it will be appreciated by those skilled in the art that the robotic vehicle 10 is capable of small radius turns in any radial direction. Moreover, manipulation of the bellows members 46 with the alternating injection of gas into the cavities 56 and evacuation of such cavities provides great control over movement of the housings 12 and 32 such that the robotic vehicle 10 can be readily maneuvered from one conduit into an intersecting conduit. In this regard, it will be noted that the actuation of the valves 70, 82 and 90 is preferably controlled by a computer 98 (see FIG. 5). This allows the travel of the robotic device 10 to be controlled by a conventional computer control device such and a "joy stick" or "mouse" (not shown).

It will be recognized that the robotic vehicle 10 is capable of transporting various monitoring devices or other items into a conduit. In this regard, vehicle 10 can be used to carry monitoring devices such as pH and pOH electrodes, oxygen content monitors, conductivity probes, radioactivity monitors, fiber optics, etc. For exampled the illustrated robotic vehicle 10 carries a television camera 100 mounted in the opening 64 of the forward housing 32 such that the interior of a conduit can be examined by the operator of the vehicle 10. To facilitate the viewing of the interior of the conduit, lights 102 can be mounted on the housing 32 to illuminate the area in front of the vehicle 10. Of course, the umbilical cable 60 serves to carry any circuitry required for operation of the camera 100 or the lights 102.

It will also be appreciated by those skilled in the art that various tools can be carried by the robotic vehicle 10. For example, scrubbing devices for cleaning the conduit, grasping devices or scoops for retrieving objects or taking samples from within the conduit, and various other remotely controlled tools can be mounted on the housings 32 and/or 12 of the robotic vehicle 10.

Figure 7:
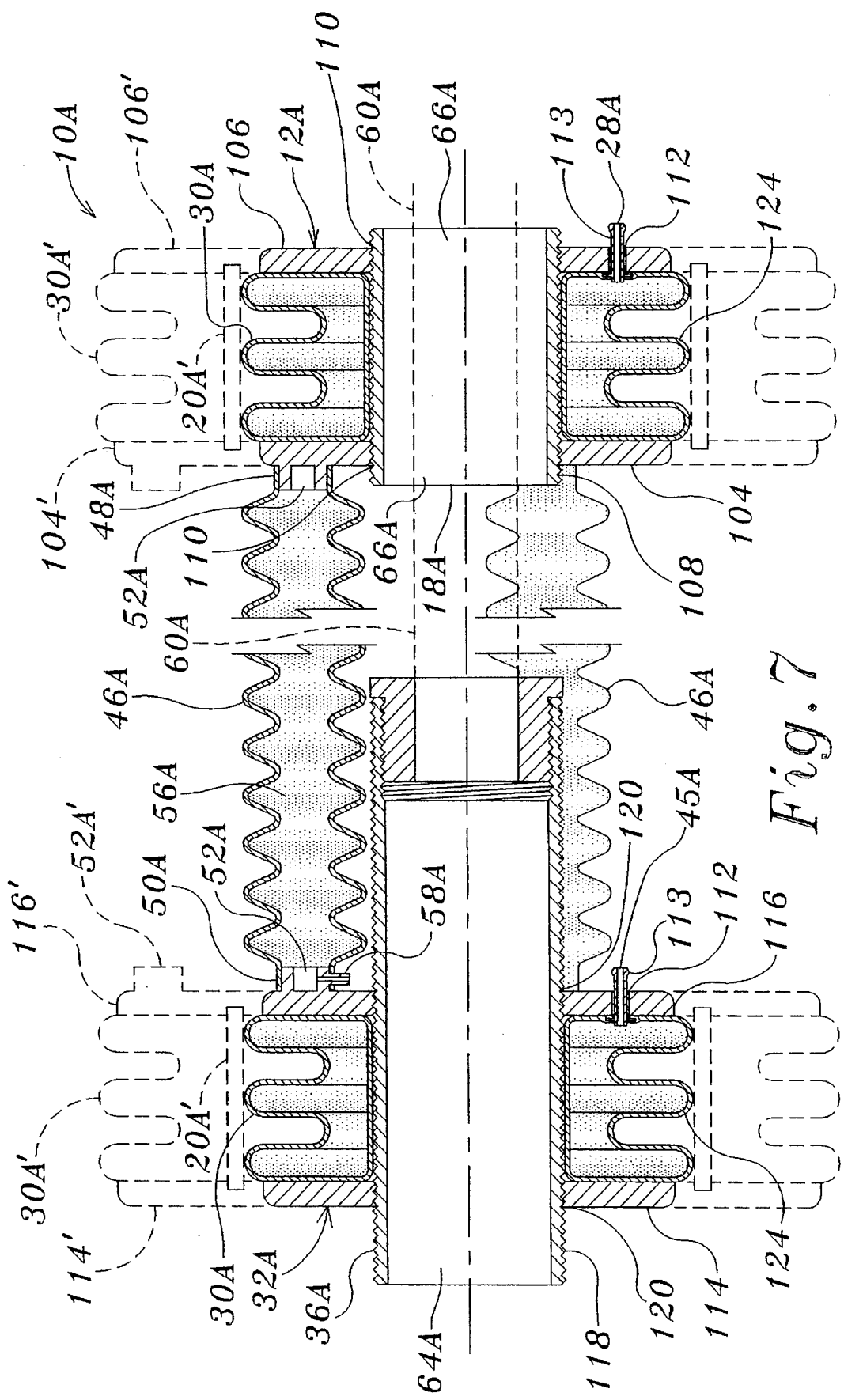
FIG. 7 illustrates a side elevation view, in section, of an alternate embodiment of the robotic vehicle of the present invention.
Figure 8:
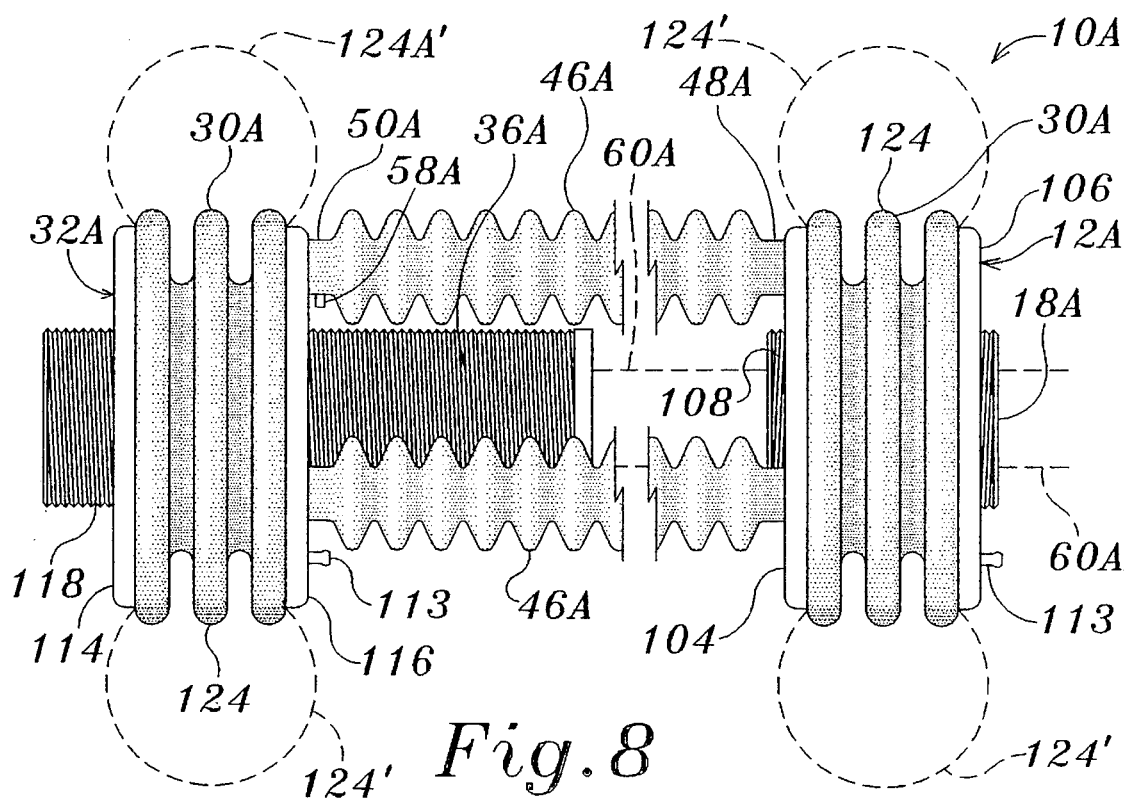
FIG. 8 illustrates a side elevation view of an alternate embodiment of the robotic vehicle of the present invention.
Figure 9:
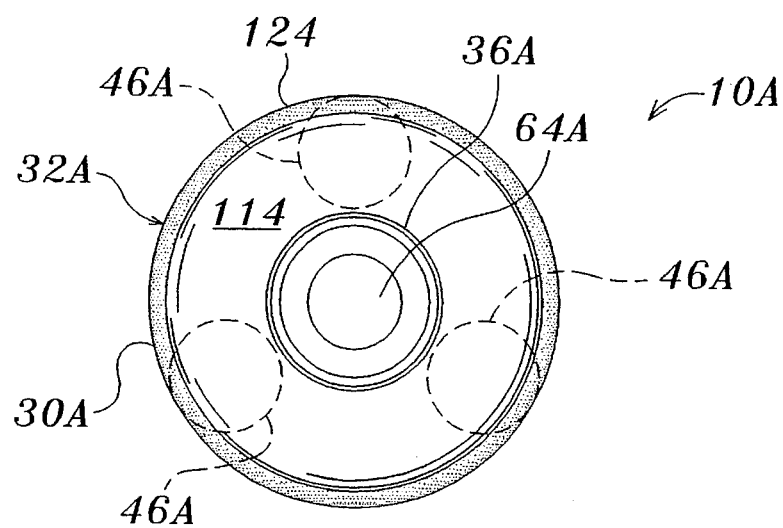
FIG. 9 illustrates a front elevation view of an alternate embodiment of the robotic vehicle of the present invention.

In FIGS. 7–9, an alternate embodiment of the robotic vehicle is illustrated at 10A. For convenience, features or components of the robotic vehicle 10A which are common to the robotic vehicle 10 described above will be referenced with common numerals followed by the alphabetic character "A".

In the preferred illustrated embodiment, the robotic vehicle 10A comprises a rear housing 12A which includes a hub portion 18A defining an opening 66A through which an umbilical cable 60A is received. Forward and rearward retainer members 104 and 106, respectively, are releasably received on the hub portion 18A and positioned in a selectively spaced relationship on the hub portion 18A so as to maintain the position of an inflatable bladder 30A as it is received about the hub portion 18A.

In the preferred embodiment the releasable securing of the retainer members 104 and 106 on the hub portion 18A is accomplished by providing the hub portion with a threaded exterior surface 108. Further, the retainer members 104 and 106 are provided with threaded openings 110 for threadably receiving the hub portion 18A. Thus, the members 104 and 106 can be threadably positioned at selected locations on the hub portion 18A, or can be threadably removed if desired. It is, howevers contemplated that other means of releasably securing the retainer members 104 and 106 to the hub portion 18A can be used.

It will also be noted that the first end portions 48A of tubular bellows members 46A are secured to the forward retainer member 104. In this regard, in the preferred embodiment the forward retainer member 104 is provided with mounting collars 52A about which the first end portions 48A of the bellows members 46A are received.

Further, an opening 112 can be provided in one of the retainer member 106 (or the retainer member 104) for receiving a fluid access stem 113 defining the fluid access port 28A of the operatively associated inflatable bladder 30A.

The robotic vehicle 10A also comprises a forward housing 32A which includes a hub portion 36A defining an opening 64A into which the umbilical cable 60A is received, and in which a video camera, measuring devices, tools, and the like, can be mounted as discussed above with regard to the robotic device 10. Forward and rearward retainer members 114 and 116, respectively, are releasably received on the hub portion 36A and positioned in a selectively spaced relationship on the hub portion 36A so as to maintain the position of an inflatable bladder 30A as it is received about the hub portion 36A.

As in the case of the rear housing 12A, the releasable securing of the retainer members 114 and 116 on the hub portion 36A is preferably accomplished by providing the hub portion with a threaded exterior surface 118. Further, the retainer members 114 and 116 are provided with threaded openings 120 for threadably receiving the hub portion 36A. Thus, the members 114 and 116 can be threadably positioned at selected locations on the hub portion 36A, or can be threadably removed if desired.

It will also be noted that the second end portions 50A of the tubular bellows members 46A are secured to the rearward retainer member 116. In this regards in the preferred embodiment the rearward retainer member 116 is provided with mounting collars 52A about which the second end portions 50A of the bellows members 46A are received. In the illustrated embodiment the mounting collars 52A of the rearward retainer member 116 are provided with fluid access stems 58B to facilitate inflation and evacuation of the bellows members 46A. Of course, it will be recognized that the access stems 58B can be provided on the mounting collars 52A of the forward retainer member 104 if desired. It is also contemplated that other means can be used to provide fluid communication to the cavities 56A of the bellows members 46A, and the stems 58B are merely illustrative of one preferred means.

Further, an opening 112 can be provided in one of the retainer members 114 or 116 for receiving a fluid access stem 113 defining the fluid access port 45A of the operatively associated inflatable bladder 30A.

In light of the above it will be recognized that by providing the removable retainer members 104 and 106 and the removable retainer members 114 and 116, the robotic vehicle can be quickly and easily assembled and disassembled, further, retainer members and inflatable bladders having various diameters can be interchangeably used to accommodate travel of the vehicle 10A through conduits of various sizes. As illustrated in broken lines in FIG. 7, where retainer members 104' and 106' and retainer members 114' and 116' have substantial diameters, supporting rims 20A and 38A can be mounted between the retainer members 104' and 106' and the retainer members 114' and 116', respectively, to support the inflatable bladders 30A'.

It will also be noted that in the preferred embodiment of the robotic vehicle 10A, the inflatable bladders 30A define corrugated outer walls 124. More specifically, the bladders 30A are fabricated of a flexible yet resilient material, such as a synthetic rubber, and are molded to define the corrugated outer walls 124. The corrugate configuration of the walls 124 allows a greater wall surface area to be disposed between the retainer members when the bladders are in an evacuated state, and, thus, allows for greater radial expansion of the bladders 30A upon inflation. For example, upon inflation the outer walls 124 of the bladders 30A deform and expand to engage the walls of a conduit as illustrated at 124' in FIG. 8. Upon evacuation of the bladders 30A the resilience of the fabricating material allows the outer walls 124 to reassume their corrugated configuration such that the bladders 30A do not obstruct movement of the operatively associated housing.

In FIGS. 10–14 a further alternate embodiment of the robotic vehicle is illustrated at 10B. For conveniences features or components of the robotic vehicle 10B which are common to the robotic vehicles 10 and/or 10A described above will be referenced with common numerals followed by the alphabetic character "B".

Figure 10:
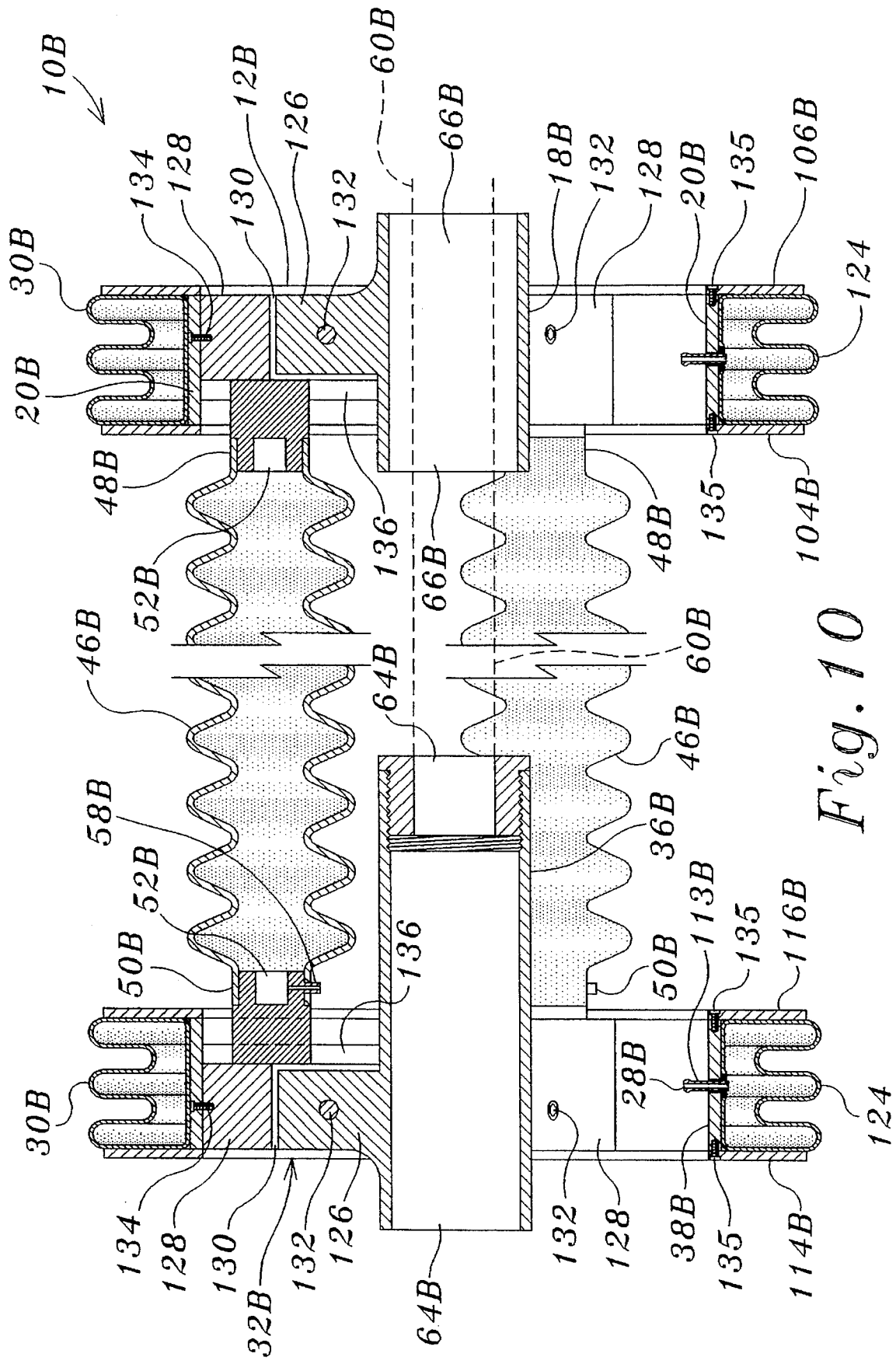
FIG. 10 illustrates a side elevation view, in section, of an alternate embodiment of the robotic vehicle of the present invention.
Figure 11:
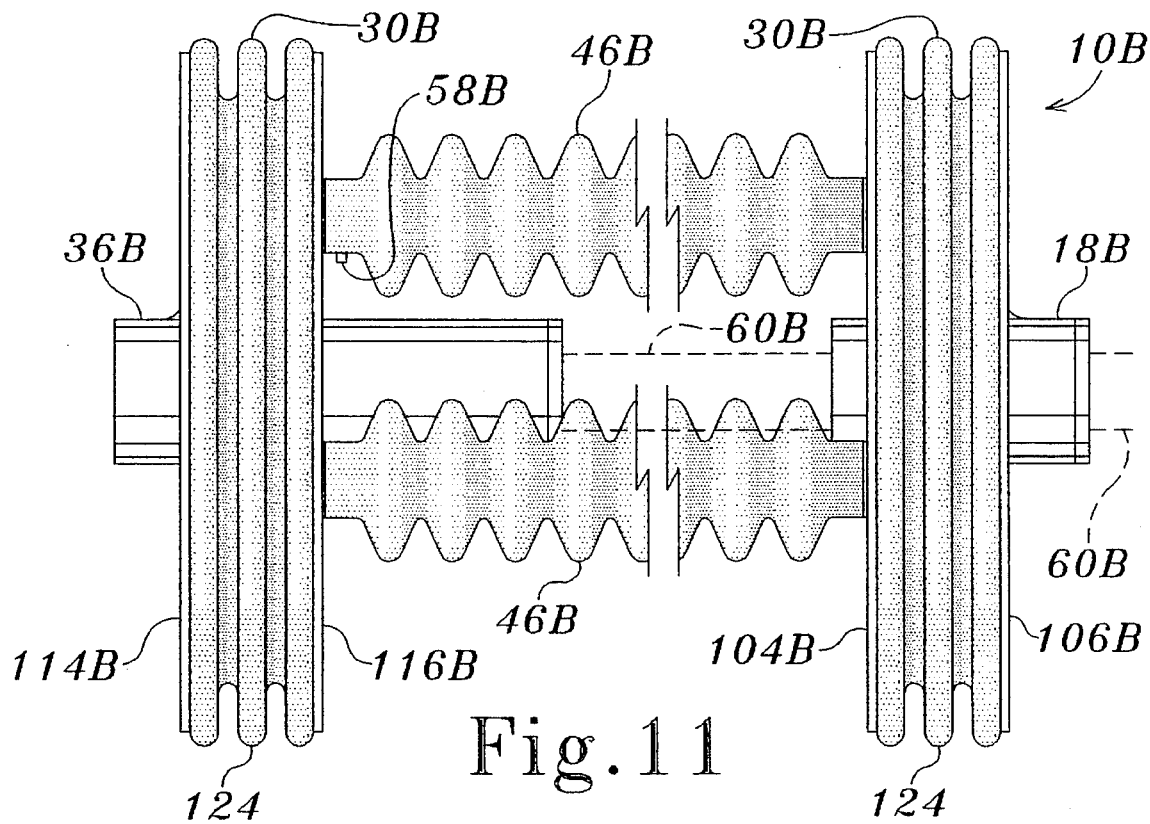
FIG. 11 illustrates a side elevation view of an alternate embodiment of the robotic vehicle of the present invention.
Figure 12:
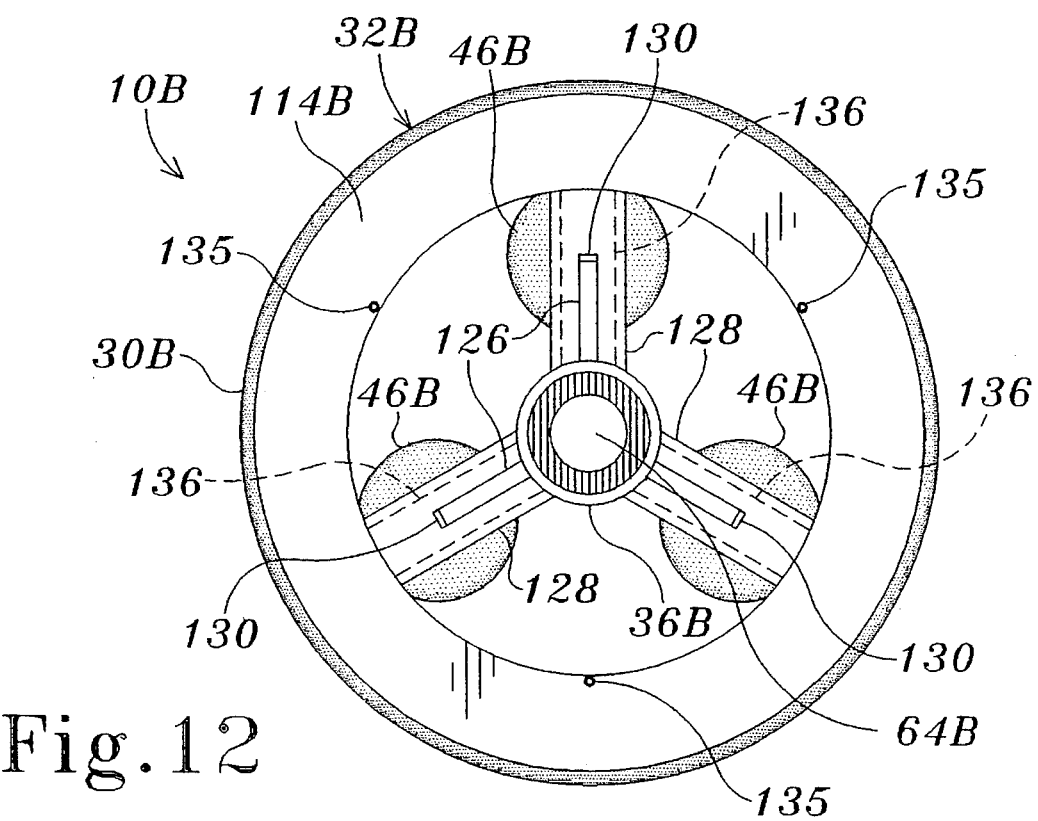
FIG. 12 illustrates a front elevation view of an alternate embodiment of the robotic vehicle of the present invention.
Figure 13:
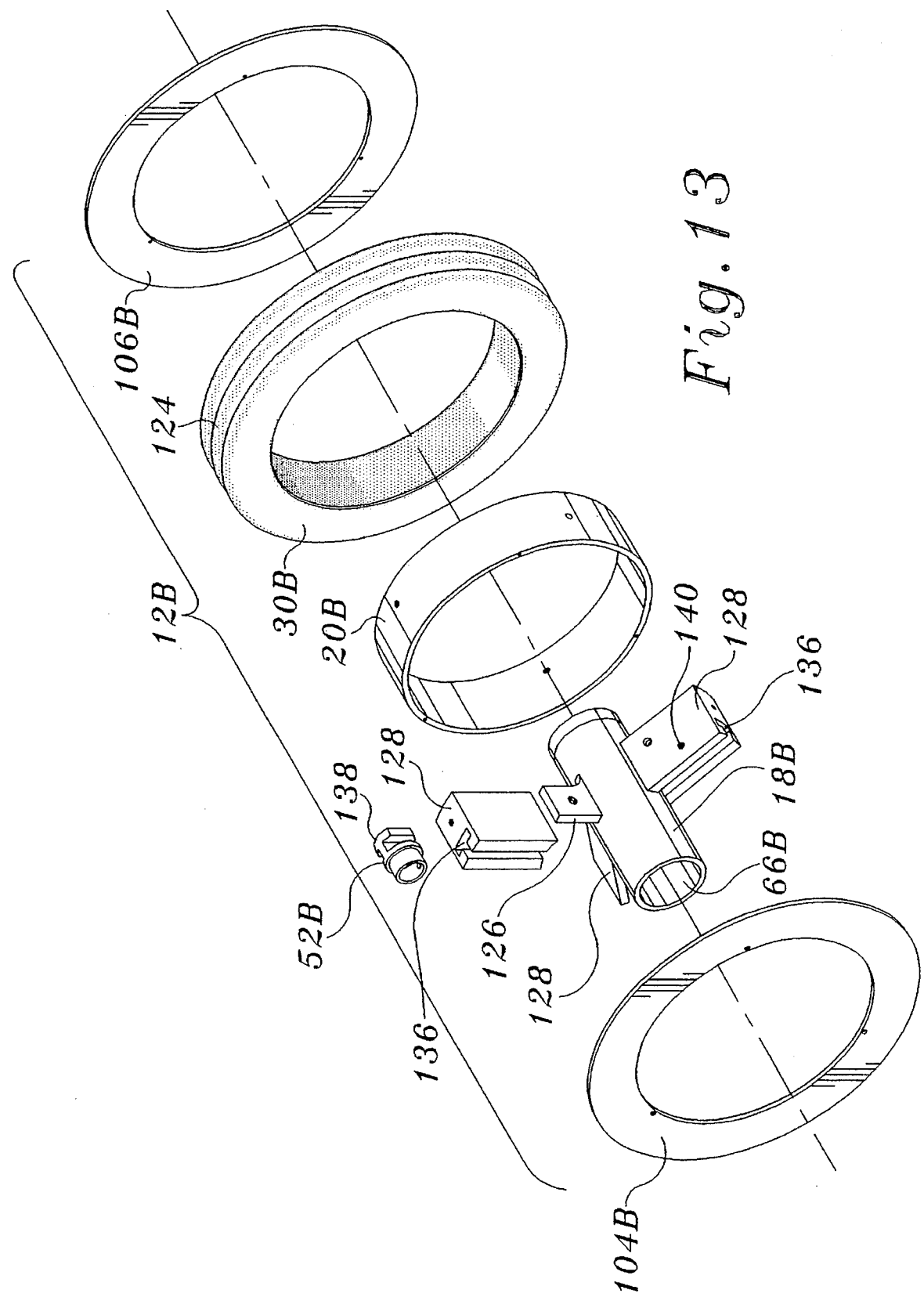
FIG. 13 illustrates a exploded prospective view of the rear housing of an alternate embodiment of the robotic vehicle of the present invention.

As best illustrated in FIGS. 10 and 13, in the preferred illustrated embodiment, the robotic vehicle 10B comprises a rear housing 12B which includes a hub portion 18B defining an opening 66B through which an umbilical cable 60B is received. At least three radially spaced mounting members 126 are provided on the exterior of the hub portion 18B, which releasably engage operatively associated spoke members 128. More specifically, in the preferred embodiment the spoke members 128 are provided with slots 130 at their proximal end portions which closely receive the operatively associated mounting members 126. Fastening devices, such as, for example, the set screws 132, are used to releasably secure the mounting members 126 in the operatively associated slots 130.

The spoke members 128 serve as mounting structures for supporting an outer rim 20B and forward and rearward retainer members 104B and 106B, respectively. More specifically, in the preferred illustrated embodiment the outer rim 20B is releasably secured to the distal ends of the spoke members 128 with suitable fastening devices such as the screws 134. The forward and rearward retainer members 104B and 106B are releasably secured on the forward and rearward edges, respectively, of the outer rim 20B so as to maintain the position of an inflatable bladder 30B which it is received about the outer rim 20B. In this regard, fastening devices, such as the screws 135, can be used to secure the retainer members 104B and 106B to the outer rim 20B.

Whereas in the preferred illustrated embodiment both retainer members 104B and 106B are releasably secured to the outer rim 20B it will be understood that the robotic vehicle 10B can be constructed such that only one of the retainer members 104B, 106B is releasably secured, or it can be constructed such that both retainer members 104B and 106B are integral with, or permanently secured to the outer rim 20B.

Because the spoke members 128 are releasably secured to the hub portion 18B, spoke members 128 of different lengths, and outer rims 20B and retainer members 104B and 106B having different diameters can be interchangeably use with the same hub portion 18B. Thus, the rear housing 12B can be quickly and easily modified to accommodate travel through conduits of various sizes.

Each of the spoke members 128 also serve to engage and support the first end portion 48B of a tubular bellows member 46B. Whereas each of the spoke members 128 can be provided with a permanently positioned mounting collar for mounting the first end portion 48B of the bellows members 46B, in the illustrated embodiment the spoke members 128 are provided with the radially adjustable mounting collars 52B. In the preferred embodiment the each of the spoke members 128 defines a keyway 136 which is radially aligned as the spoke member is mounted on the hub portion 18B. In turn, the mounting collars 52B define key portions 138 (See FIG. 13) which are slidably received in the keyway 136 of an operatively associated spoke member 128. The selected radial position of the key portions 138 in the keyways 136 can be releasably fixed with suitable securing devices such as for example the set screws 140.

With respect to the radial adjustment of the mounting collars 52B, for most applications the positioning of the collars 52B proximate the distal end portions of the spoke members 128 results in the most efficient operation of the robotic vehicle 10B. However, depending upon the configuration of the conduit in which the vehicle 10B is to travel, the positioning of the bellows members 46B in closer proximity to the hub portion 18B may be desirable. Moreover, when spokes of different lengths are being interchangeably used the releasable securing of the mounting collars 52B allows the same mounting collars 52B to be used. Thus, when changing the spoke members 128, the mounting collars 52 can remain secured to the bellows members 46B and simply reinstalled on the new spoke members.

The robotic vehicle 10B also comprises a forward housing 32B which is similar in construction to the rear housing 12B. In this regard, the forward housing includes a hub portion 36B defining an opening 64B into which the umbilical cable 60B is received and in which a video camera, measuring devices, tools, and the like, can be mounted as discussed above with regard to the robotic vehicles 10.

At least three radially spaced mounting members 126 are provided on the exterior of the hub portion 36B, which releasably engage operatively associated spoke members 128. As with the spoke members of the rear housing 12B, the spoke members 128 of the forward housing are provided with slots 130 at their proximal end portions which closely receive the operatively associated mounting members 126. Fastening devices, such as, for example, the set screws 132, are used to releasably secure the mounting members 126 in the operatively associated slots 130.

The spoke members 128 serve as mounting structures for supporting an outer rim 38B and forward and rearward retainer members 114B and 116B, respectively, with the outer rim 38B being releasably secured to the distal ends of the spoke members 128 with suitable fastening devices such as the screws 134. The forward and rearward retainer members 114B and 116B of the housing 32B are releasably secured on the forward and rearward edgest respectively, of the outer rim 38B so as to maintain the position of an inflatable bladder 30B which is received about the outer rim 38B. As in the case of the rear housing 12B, it is contemplated that the housing 32B can be constructed such that only one of the retainer members 114B, 116B is releasably secured, or it can be constructed such that both retainer members 114B and 116B are integral with, or permanently secured to the outer rim 38B.

Each of the spoke members 128 of the forward housing 32B also serve to engage and support the second end portion 50B of the operatively associated tubular bellows member 46B. In the preferred illustrated embodiment the spoke members 128 are provided with the radially adjustable mounting collars 52B, as described with respect to the rear housing 12B, with each of the spoke members 128 defining a keyway 136 and the mounting collars 52B defining key portions 138 (See FIG. 14) which are slidably received in the keyways 136 of operatively associated spoke members 128.

Thus, the forward housing 32B, like the rear housing 12B, allows the interchangeable use of spoke members 128 of different lengths and provides for the releasable securing and radial adjustability of the mounting collars 52B. Accordingly, the robotic vehicle 10B can be quickly and easily modified for travel in conduits of various sizes.

In light of the above it will be recognized that the present invention provides robotic vehicle having great advantages over the prior art. The robotic vehicle of the present invention can carry various monitors, tool or other devices into an enclosed conduits and its great maneuverability allows it to travel between intersecting conduits and otherwise negotiate complex conduit systems.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A robotic vehicle for travel through a conduit, said robotic vehicle comprising:

a forward housing including a hub portion and forward and rearward retainer members which releasably engage and which are releasably secured to said hub portion in a selectively spaced relationship such that said forward and rearward retainer members define selectively spaced retaining walls extending radially from said hub portion, said forward housing being provided with surface engaging means for selectively engaging at least one wall of said conduit, whereby said forward housing is selectively held in a stationary position within said conduit by said surface engaging means, said surface engaging means of said forward housing including at least one expandable bladder positioned between said forward and rearward retainer members so as to be releasably held in place by and between said selectively spaced retaining walls of said forward and rearward retainer members, said expandable bladder defining an internal cavity and being expandable upon the injection of gas into said cavity of said expandable bladder whereby said expandable bladder selectively engages walls of said conduit;

at least three selectively extendable members, each said extendable member defining a cavity therein and defining a forward end portion secured to said forward housing and a rear end portion secured to said rear housing; and means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

2. The robotic vehicle of claim 1 wherein each said extendable members comprises a tubular bellows member.

3. A robotic vehicle for travel through a conduit, said robotic vehicle comprising:

a forward housing including a hub portion and forward and rearward retainer members releasably secured to said hub portion in a selectively spaced relationship, said forward housing being provided with surface engaging means for selectively engaging at least one wall of said conduit, whereby said forward housing is selectively held in a stationary position within said conduit by said surface engaging means, said surface engaging means of said forward housing including at least one expandable bladder positioned between, and releasably held in place by, said forward and rearward retainer members, said expandable bladder defining an internal cavity and being expandable upon the injection of gas into a cavity of said expandable bladder whereby said expandable bladder selectively engages walls of said conduit, said hub portion of said forward housing defining a threaded exterior surface, and said forward and rearward retainer members of said forward housing being provided with threaded openings for threadably receiving said hub portion of said forward housing;

a rear housing including a hub portion, and forward and rearward retainer members releasably secured to said hub portion in a selectively spaced relationship, said rear housing being provided with surface engaging means for selectively engaging at least one wall of said conduit, whereby said rear housing is selectively held in a stationary position within said conduit by said surface engaging means, said surface engaging means of said rear housing including at least one further expandable bladder positioned between, and releasably held in place by, said forward and rearward retainer members of said rear housing, said further expandable bladder defining an internal cavity, said expandable bladder being expandable upon the injection of gas into said cavity of said expandable bladder whereby said expandable bladder selectively engages walls of said conduit, said hub portion of said rear housing defining a threaded exterior surface, and said forward and rearward retainer members of said rear housing being provided with threaded openings for threadably receiving said hub portion of said rear housing;

at least three selectively extendable members, each said extendable member defining a cavity therein and defining a forward end portion secured to said forward housing and a rear end portion secured to said housing; and means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

4. The robotic vehicle of claim 3 wherein each said extendable member comprises a tubular bellows member.

5. The robotic vehicle of claim 4 wherein said rearward retainer member of said forward housing is provided with a plurality of mounting collars, each of which serves to releasably engage a first end portion of an operatively associated said tubular bellows member, and wherein said forward retainer member of said rear housing is provided with a plurality of mounting collars, each of which serves to releasably engage a second end portion of an operatively associated said tubular bellows member.

6. The robotic vehicle of claim 1 wherein said expandable bladders of said forward housing and said rear housing define corrugated outer wall portions.

7. A robotic vehicle for travel through a conduit, said robotic vehicle comprising:

a forward housing including a hub portion and forward and rearward retainer members releasably secured to said hub portion in a selectively spaced relationship, said forward housing being provided with surface engaging means for selectively engaging at least one wall of said conduit, whereby said forward housing is selectively held in a stationary position within said conduit by said surface engaging means, said surface engaging means of said forward housing including at least one expandable bladder positioned between, and releasably held in place by, said forward and rearward retainer members, said expandable bladder defining an interval cavity and being expandable upon the injection of gas into said cavity of said expandable bladder whereby said expandable bladder selectively engages walls of said conduit, said forward housing being provided with a plurality of spoke members radiating from said hub portion of said forward housing and an outer rim for releasably securing said forward and rearward retainer members of said forward housing to said hub portion of said forward housing, said spoke members having proximal end portions releasably secured to said hub portion of said forward housing and distal end portions secured to said outer rim, said outer rim having a forward edge for engaging said forward retainer member of said forward housing and a rearward edge for engaging said rearward retainer member of said forward housing;

a rear housing including a hub portion, and forward and rearward retainer members releasably secured to said hub portion in a selectively spaced relationship, said rear housing being provided with surface engaging means for selectively engaging at least one wall of said conduit, whereby said rear housing is selectively held in a stationary position within said conduit by said surface engaging means, said surface engaging means of said rear housing including at least one further expandable bladder positioned between, and releasably held in place by, said forward and rearward retainer members of said rear housing, said further expandable bladder defining an internal cavity, said expandable bladder being expandable upon the injection of gas into said cavity of said expandable bladder whereby said expandable bladder selectively engages walls of said conduit, said rear housing being provided with a plurality of further spoke members radiating from said hub portion of said rear housing and a further outer rim for releasably securing said forward and rearward retainer members of said rear housing to said hub portion of said rear housing, said further spoke members having proximal end portions releasably secured to said hub portion of said rear housing and distal end portions secured to said further outer rim, said further outer rim having a forward edge for engaging said forward retainer member of said rear housing and a rearward edge for engaging said rearward retainer member of said rear housing;

at least three selectively extendable members, each said extendable member defining a cavity therein and defining a forward end portion secured to said forward housing and a rear end portion secured to said rear housing; and means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

8. The robotic vehicle of claim 7 wherein said expandable bladders of said forward housing and said rear housing define corrugated outer wall portions.

9. The robotic vehicle of claim 7 wherein each said extendable member comprises a tubular bellows member.

10. The robotic vehicle of claim 7 wherein mounting collars are releasably secured to at least three of said spoke members of said forward housing for releasably engaging first end portions of operatively associated said extendable member, and wherein further mounting collars are releasably secured to at least three of said further spoke members of said rear housing for releasably engaging second end portions of operatively associated said extendable member.

11. The robotic vehicle of claim 10 wherein each said spoke member and further spoke member defines a radially aligned keyway, and each said mounting collar defines a key portion for being releasably received in an operatively associated said keyway, whereby the position of said mounting collars and the of said spoke members and said further spoke members and the operatively associated said extendable members is radially adjustable.

12. A robotic vehicle for travel through a conduit, said robotic vehicle comprising:

a forward housing including a hub portion and forward and rearward retainer members releasably secured to said hub portion in a selectively spaced relationship, said hub portion of said forward housing defining a threaded exterior surface, and said forward and rearward retainer members of said forward housing being provided with threaded openings for threadably receiving said hub portion of said forward housing, said forward housing being provided with surface engaging means for selectively engaging at least one wall of said conduit, whereby said forward housing is selectively held in a stationary position within said conduit by said surface engaging means, said surface engaging means of said forward housing including at least one expandable bladder positioned between, and releasably held in place by, said forward and rearward retainer members, said expandable bladder defining an internal cavity and being expandable upon the injection of gas into said cavity of said expandable bladder whereby said expandable bladder selectively engages walls of said conduit;

a rear housing including a hub portion, and forward and rearward retainer members releasably secured to said hub portion in a selectively spaced relationship, said hub portion of said rear housing defining a threaded exterior surface, and said forward and rearward retainer members of said rear housing being provided with threaded openings for threadably receiving said hub portion of said rear housing, said rear housing being provided with surface engaging means for selectively engaging at least one wall of said conduit, whereby said rear housing is selectively held in a stationary position within said conduit by said surface engaging means, said surface engaging means of said rear housing including at least one further expandable bladder positioned between, and releasably held in place by, said forward and rearward retainer members of said rear housing, said further expandable bladder defining an internal cavity, said expandable bladder being expandable upon the injection of gas into said cavity of said expandable bladder whereby said expandable bladder selectively engages walls of said conduit;

at least three selectively extendable members, each said extendable member defining a cavity therein and defining a forward end portion secured to said forward housing and a rear end portion secured to said rear housing; and means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

13. A robotic vehicle for travel through a conduit, said robotic vehicle comprising:

a forward housing including a hub portion and a plurality of spoke members radiating from said hub portion of said forward housing, said spoke members having proximal end portions releaseably secured to said hub portion of said forward housing and distal end portions secured to an outer rim, said outer rim having a forward edge for engaging a forward retainer member and a rearward edge for engaging a rearward retainer member, said forward housing being provided with surface engaging means for selectively engaging at least one wall of said conduit, whereby said forward housing is selectively held in a stationary position within said conduit by said surface engaging means, said surface engaging means of said forward housing including at least one expandable bladder positioned between, and releasably held in place by, said forward and rearward retainer members, said expandable bladder defining an internal cavity and being expandable upon the injection of gas into said cavity of said expandable bladder whereby said expandable bladder selectively engages walls of said conduit;

a rear housing including a hub portion and a plurality of further spoke members radiating from said hub portion of said rear housing, said further spoke members having proximal end portions releasably secured to said hub portion of said rear housing and distal end portions secured to a further outer rim, said further outer rim having a forward edge for engaging a further forward retainer member and a rearward edge for engaging a further rearward retainer member, said rear housing being provided with surface engaging means for selectively engaging at least one wall of said conduit, whereby said rear housing is selectively held in a stationary position within said conduit by said surface engaging means, said surface engaging means of said rear housing including at least one further expandable bladder positioned between, and releasably held in place by, said further forward and rearward retainer members, said further expandable bladder defining an internal cavity and being expandable upon the injection of gas into said cavity of said further expandable bladder whereby said further expandable bladder selectively engages walls of said conduit;

at least three selectively extendable members, each said extendable member defining a cavity therein and defining a forward end portion secured to said forward housing and a rear end portion secured to said rear housing; and means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

14. The robotic vehicle of claim 13 wherein mounting collars are releasably secured to at least three of said spoke members of said forward housing for releasably engaging first end portions of operatively associated said extendable member, and wherein further mounting collars are releasably secured to at least three of said further spoke members of said rear housing for releasably engaging second end portions of operatively associated said extendable member.

15. The robotic vehicle of claim 14 wherein each said spoke member and further spoke member defines a radially aligned keyway, and each said mounting collar defines a key portion for being releasably received in an operatively associated said keyway, whereby the position of said mounting collars and the of said spoke members and said further spoke members and the operatively associated said extendable members is radially adjustable.

\* \* \* \* \*